No. 720,886. PATENTED FEB. 17, 1903.
K. H. BURROWES.
KINDERGARTEN GAME BOARD.
APPLICATION FILED MAR. 23, 1900.
NO MODEL.
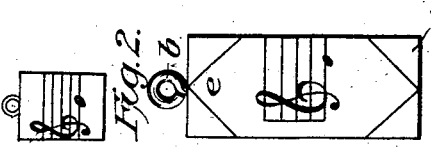

UNITED STATES PATENT OFFICE.

KATHARINE H. BURROWES, OF DETROIT, MICHIGAN.

KINDERGARTEN GAME-BOARD.

SPECIFICATION forming part of Letters Patent No. 720,886, dated February 17, 1903.

Application filed March 23, 1900. Serial No. 9,851. (No model.)

*To all whom it may concern:*

Be it known that I, KATHARINE H. BURROWES, a citizen of the United States, residing at Detroit, county of Wayne, State of Michigan, have invented a certain new and useful Improvement in Kindergarten Game-Boards; and I declare the following to be a full, clear, and exact description of the invention, such as will enable others skilled in the art to which it pertains to make and use the same, reference being had to the accompanying drawings, which form a part of this specification.

This invention relates to educational apparatus, and has for its object an improved appliance for teaching and fixing in the minds of pupils the characters which indicate musical notes and the scales of music.

Figure 1 shows one of the removable blocks having imprinted thereon the character indicating the musical note c. Fig. 2 shows another removable block having imprinted thereon the character e. Fig. 3 is a representation of a board on which is indicated the twelve scales known as the "major" scales.

The method of instruction consists in impressing upon the mind of the pupil the character which indicates the musical note or a musical scale and the value and position of a note in a scale by requiring him to take a block upon which is imprinted the proper character and properly locate the block on the game-board, upon which is the representation of a scale formation.

To teach the scales, a form of chart is used divided vertically into two compartments, in each of which are six scales. At the left side of the board (which also is preferably made to hang vertically on the wall) are characters which indicate the scale-signatures, and for the purposes of aiding the memory there are given, in addition to the correct musical names of the scale-signature, other names which may by association fix in the mind the key-note and the correct name of the scale— as, for example, for the scale of C is placed the word "Charlie" scale, the word selected being the one which begins with C and a word which will be easily remembered and with which the C will be associated. Next below appears the scale of G, and this is given the word "George" scale or any other word which by association would fix in the mind the G of the name of the scale. Then follows the "Davie" scale, "Arthur" scale, "Eddie" scale, "Billy" scale, these being terms which by association will fix in the mind of the pupil the D, A, E, and B of these scales. On the right-hand side are the scales of F, B-flat, E-flat, A-flat, D-flat, and G-flat, and the letter of this scale is fixed in the mind of the pupil in the same way by using the letter as the initial of a person or some well-known thing, and the names of the persons are employed in the game which is played with the board.

The numerals 1, 2, 3, 4, 5, 6, 7, and 8 in Fig. 4 indicate pins for hanging blocks, as B and C, upon. Said pins are arranged in rows, so that the blocks hung upon them shall lie in a line opposite the matter indicating the scale, and the individual pins are arranged at distances apart which indicate the relative pitch of the notes indicated by the blocks which are hung upon them. Thus in the scale of C the distance apart of the pins 3 and 4 indicates that there is a semitone's difference in pitch between the notes e and f, and in the scale of F the same thing indicates that there is a semitone's difference of pitch between a and the next note, which must therefore be B-flat, as also indicated by the signature.

The board and the blocks may be made the basis of a great number of different games, just as a pack of playing-cards may be made the basis of a different number of games, and by my invention I make it possible in this way to teach to the pupil by means of the games which are founded on the boards and the blocks these fundamental matters of music, which become so thoroughly fixed in the mind of the pupil that they can never afterward be forgotten.

What I claim is—

In an apparatus for teaching music, a chart, provided with horizontal rows of pins, the pins in each row being located a distance apart to denote the intervals of the diatonic scale, said rows of pins being located vertically with reference to each other so that the constituent pins of said rows form vertical as well as horizontal columns, blocks having the designation of the different notes and half-notes upon them, said blocks being adapted to be hung upon said pins, said chart being provided with the signatures of the different scales at the ends of the rows of blocks hung upon said pins.

In testimony whereof I sign this specification in the presence of two witnesses.

KATHARINE H. BURROWES.

Witnesses:
CHARLES T. BURTON,
JOHN N. GOODRICH.